(No Model.)

4 Sheets—Sheet 1.

P. J. NOYES.
PILL MACHINE.

No. 582,794.

Patented May 18, 1897.

Witnesses

Inventor:
Parker J. Noyes,
pr Alesa D. Dois,
Attorney.

(No Model.) 4 Sheets—Sheet 2.

P. J. NOYES.
PILL MACHINE.

No. 582,794. Patented May 18, 1897.

Witnesses
Geo. R. Hamlin

Inventor:
Parker J. Noyes.
per Rhesa D. Bois.
Attorney.

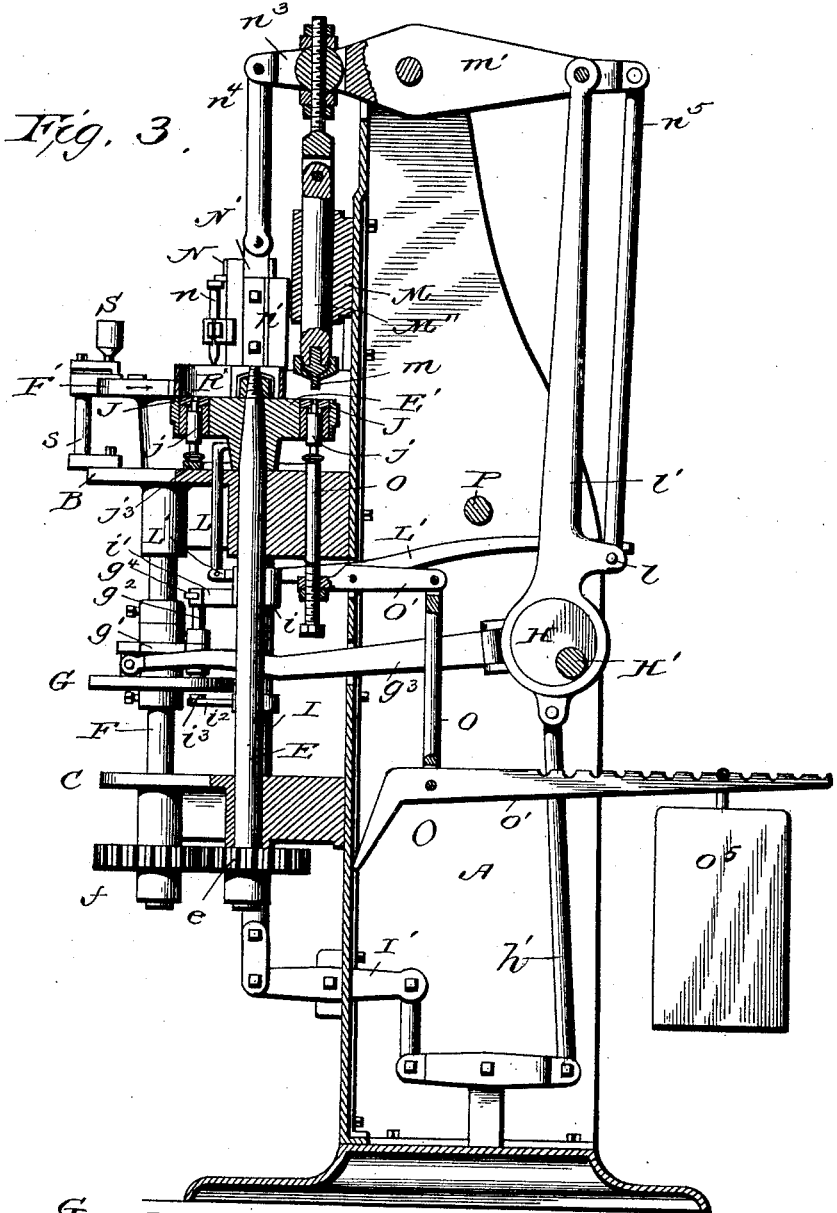

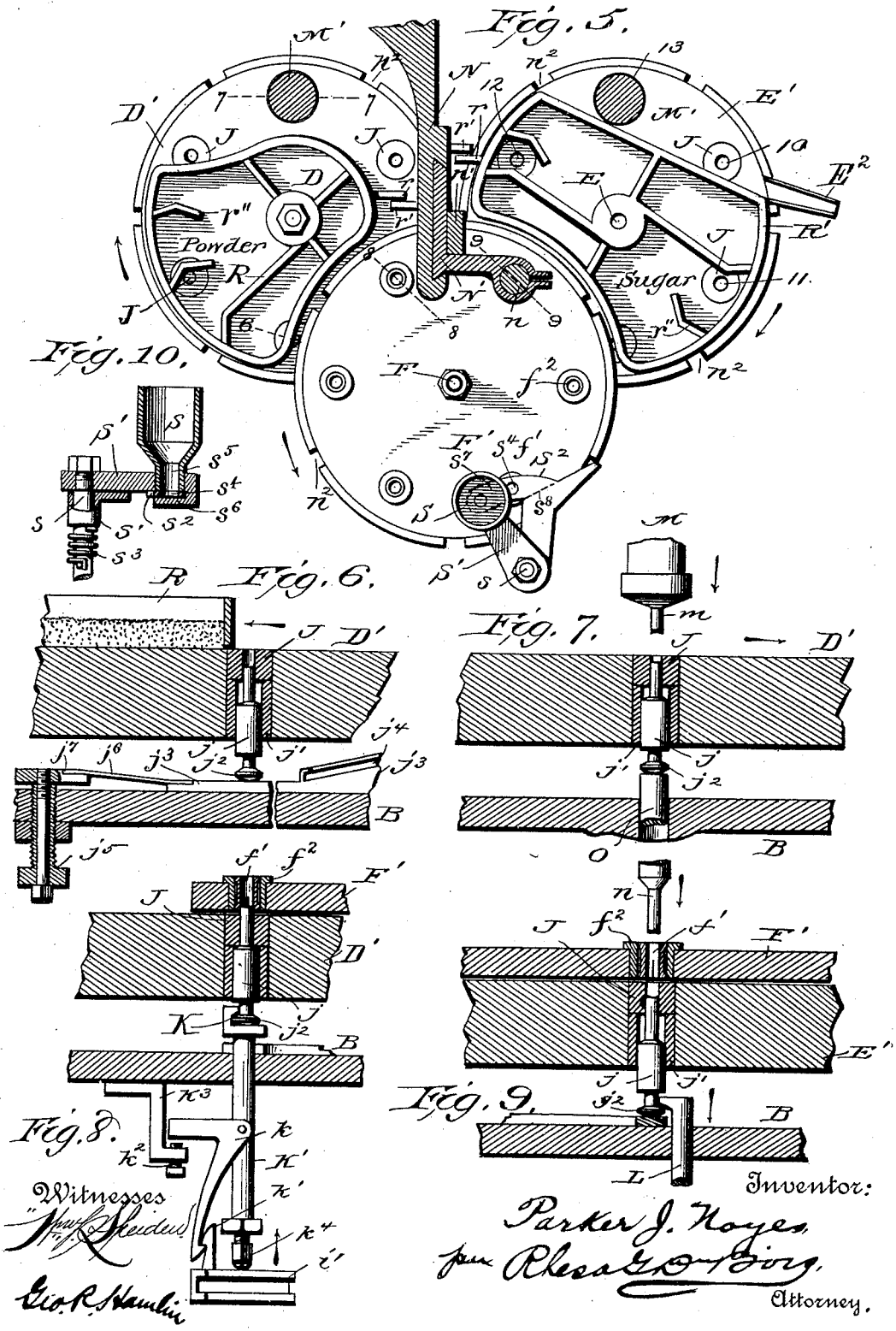

UNITED STATES PATENT OFFICE.

PARKER J. NOYES, OF LANCASTER, NEW HAMPSHIRE.

PILL-MACHINE.

SPECIFICATION forming part of Letters Patent No. 582,794, dated May 18, 1897.

Application filed June 17, 1895. Renewed February 26, 1897. Serial No. 625,180. (No model.)

*To all whom it may concern:*

Be it known that I, PARKER J. NOYES, a citizen of the United States, residing at Lancaster, in the county of Coos and State of New Hampshire, have invented certain new and useful Improvements in Pill-Machines; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention has reference to that class of machines which make tablets or pills by compression, my object being to construct a superior mechanism which will automatically compress the coating upon the tablet.

A further object of my device is to combine in one machine a mechanism for forming the tablet preliminary to automatically applying the coating, so that the whole process can be performed in one operation.

These objects are accomplished by the peculiar features and combinations of parts more fully described hereinafter, and pointed out in the claims.

Figure 1:
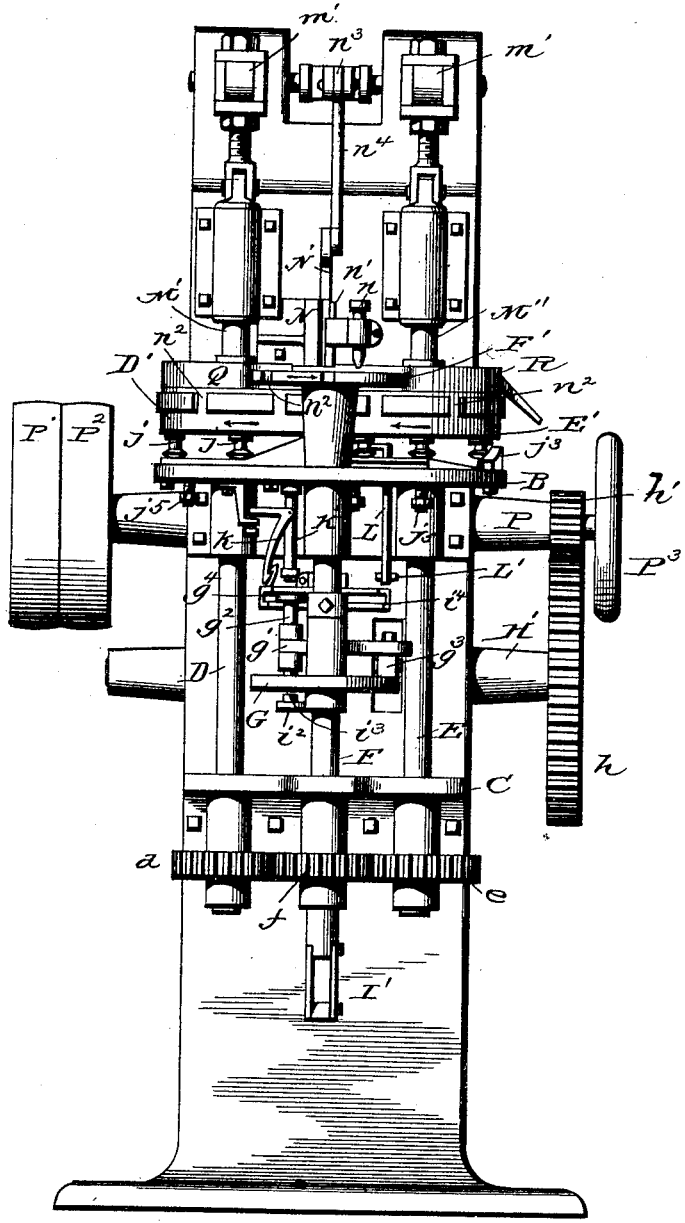
Figure 2:
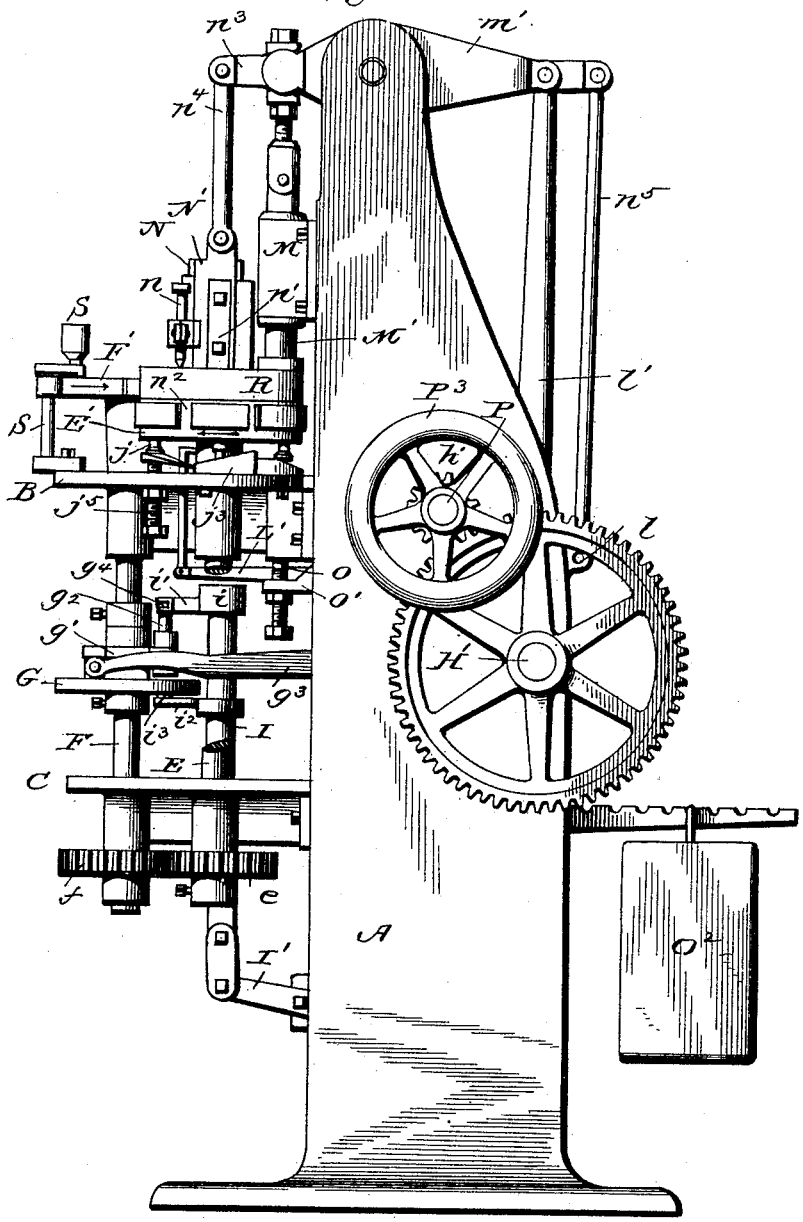

Referring to the drawings, Figure 1 is a front elevation of the machine. Fig. 2 is a side elevation. Fig. 3 is a vertical section, parts being shown in full lines. Fig. 4 is a detail view of the machine for operating the die-plates. Fig. 5 is a plan view of the die-plates and transferring-disk. Figs. 6, 7, 8, and 9 are enlarged sections through the respective lines 6, 7, 8, and 9 of Fig. 5; and Fig. 10 is a detail view to be hereinafter described.

*Framework.*—The reference-letter A denotes a column having a suitable base and adapted to form the support for the operating parts of the machine. Upon the front face of this column are secured the knees B C, provided with suitable bearings for three vertical shafts D, E, and F, which carry rotary disks or plates containing the forming and coating molds and the transfer-disk.

*Forming and coating mold disks.*—The forming and coating disks are designated by the letters D' and E', respectively, and are each fixed to revolve with the upper ends of said shafts and are by preference made circular and contain an annular series of removable molds or die-blocks J, in which operate vertically-movable compressing-plungers M' M'' and ejectors $j$. The coating-molds in disk E' are given an area larger than the forming-molds in disk D' in order to allow the coating material to entirely surround the body of the tablet as it comes from the forming-mold.

*Transferring mechanism.*—Rotating at the same speed and in unison with the forming and coating disks, and located at a point intermediate of their axes, is the transferring-disk F', which is provided with an equidistant annular series of chambers $f^2$, equal in number to those in the forming and coating disks. This disk overlaps the forming and coating disks sufficiently to allow its chambers $f^2$ to register with the molds J, so that the compressed tablet can be discharged upward into the chambers of the transfer-disk, whence it is afterward ejected downward into the coating-molds and there completed. In order to prevent the tablets from dropping out of the chambers of the transfer-disk while being carried around, I provide said chambers with split bushings, which are expanded laterally by the tablet when forced up into them from the forming-mold J below. This expulsion of the tablet after its formation is effected by a series of traveling ejectors $j$, carried by the disk and having enlarged bodies movable in bushings $j'$. These ejectors form the bottoms of the molds and are supported and travel on an annular cam-surface $j^3$. The lower ends are provided with heads $j^2$, which pass into a hook K on the upper end of a vertically-movable rod K', actuated up and down at the moment an ejector and a chamber are brought into coincidence, as seen in Fig. 8. At this instant the movement of the disks must be arrested to allow the chambers in the transfer-disk to receive the compressed tablet and also to allow the compressing-plungers to operate in the molds. Therefore the lower end of the rod K' is arranged in the path of a grooved segment $i$, forming part of the locking mechanism, so that as the latter rises in the locking operation it will strike and operate the ejector. The immediate withdrawal of the ejector now becomes necessary in order to permit the disks to resume their rotations, and this is accomplished by means of an automatic catch comprising a trip-lever $k$, having a hook at its lower end, which passes into engagement with a hook $k'$ on the segment and locks the two parts together when the segment moves upward. The downstroke of the segment withdraws the ejector. The unlocking of these parts is effected by the laterally-extending arm of the lever $k$, which overhangs and comes in contact with a set-screw $k^2$ on a bracket $k^3$ in the downward movement. An adjusting-screw $k^4$ is applied to the lower end of rod $K'$ to facilitate the proper adjustment of these particular parts.

The completion of the downward stroke of the segment $i'$, and the consequent withdrawal of the ejector $j$, is simultaneous with the unlocking of the disks to allow them to advance another step. The head of the ejector $j$ then passes out of the hook $K$. The transfer-disk is now moved step by step from point 8 8 throughout five-sixths of a complete circle and carries the tablet under the overhanging stationary ejector $n$ at transferring-point 9 9, whereupon the ejector descends into the chamber or box $f^2$ and pushes the tablet out and into the coating-mold below in disk $E'$.

*Compressing mechanism.*—The compressing-plungers $M'$ and $M''$ move up and down over the disks in boxes $M$, secured to the face of the standard. The upper ends of the plungers are adjustably connected to a walking-beam $m'$, the rear arm of which is in turn connected to a pitman $l'$, actuated by eccentric $H$ on drive-shaft $H'$. As the forming and compressing disks revolve the molds are successively brought beneath the compressing-plungers, having first gathered their supply of material from the open-bottomed boxes $R$ and $R'$. The locking mechanism is so timed that when the plungers and molds are brought into coincidence the disks will momentarily stop and allow the plungers and ejectors to operate, after which a continued revolution of the eccentric $H$ withdraws the plungers and ejectors, unlocks the disks, and allows them to advance a step farther. The formation of a tablet will now be followed: Assuming that the forming-mold $J$ in the disk $D$ has passed from the powder-box $R$ to the point 7 7 beneath the first plunger $M'$, the ejector $j$, carried by this mold, will rest upon the end of the vertical rod $O$, and the plunger $M'$ will descend and compress and form the tablet, after which the disk advances two more steps and brings the tablet beneath the box $f^2$ at point 8 8 in the transfer-disk. The stoppage of the disk at this point is accompanied by the upward expulsion of the tablet by the ejector $j$ into the box $f^2$, as seen in Fig. 8. The tablet is then carried around to the point 9 9 beneath the overhanging stationary ejector $n$, when it is ejected downward into the partially-filled coating-mold of the disk $E'$. From this point the tablet is carried beneath the sugar-box $R'$ and a top coating of sugar deposited on it, after which it passes beneath the second plunger $M''$ at the point 13, and the whole is compressed and the tablet completed. Another movement of the disk $E'$ from the point 13 to the point 10 causes the ejector $j$ to move up the cam-surface $j^3$, as seen in Fig. 2, and expel the finished tablet, which rolls out of the discharge-chute $E^2$. The mold now being emptied passes on to the point 11, and in so doing the head of its accompanying ejector passes into the downward-sloping groove $j^4$ in the top of the cam $j^3$ and draws down the ejector for the reception of the lower layer of sugar-coating. In going from this latter point the head $j^2$ of the ejector passes under the hooked end of a rod $L$, and this rod has its lower end connected with a lever $L'$, one arm of which is lifted by a rod $l$, Fig. 3, just before the mold and its contents come beneath the overhanging ejector $n$, in order to quickly lower the traveling ejector $j$ below, so as to enlarge the mold to prepare it for the reception of the tablet, whereupon the operation of receiving the top supply of coating material follows, and the coating operation is finished in the manner before described.

*Safety attachment.*—In event of an obstacle, such as an overplus of material, which might create excessive pressure in the molds, a safety attachment is provided. This attachment consists of a yieldable rod $O$, so disposed in the path of the traveling ejectors $j$ that when they are brought beneath the plunger $M'$ (see Fig. 3) they will rest upon the upper end of said rod. This rod is sustained by the end of a lever $O'$, connected with a downwardly-extending link $O^2$, in turn attached to a substantially horizontal lever $O^3$, fulcrumed at $O^4$. The outer end of the latter lever is provided with a weight $O^5$, retainable at various points by means of notches on its upper surface. The short arm of the lever bears against the standard. Any desired amount of resistance can be offered to the compressing-plunger by adjusting the weight of the lever.

*Adjustable cam-surface.*—In the course of the revolution of each mold-disk it becomes necessary to adjust the cam-surface with great particularity in order to bring the upper ends of the traveling punches $j$ to the right height within the molds to give the latter the exact capacity required as they are presented to the feed-box. For this purpose an adjustable cam-surface (see Fig. 6) is formed out of a yielding bar of metal $j^6$, having one end resting upon a block $j^7$, forming a continuation of the cam-surface, and adjustable vertically through the medium of an adjusting-screw $j^5$. A yielding cam-surface of this kind is placed under each of the disks $D'$ and $E'$. Powder is fed to the molds in disk $D'$ by box $R$ and sugar to the molds in disk $E'$ by box $R'$, both of which are loosely attached to rest on top of the disks $D'$ and $E'$, being retained in place by the tops of the shafts $D$ and $E$, which pass through holes in the framing, and they are prevented from revolving by means of lugs $r$, which come in contact with fixed lugs $r^2$ on the bar N. These boxes have open tops and bottoms, so that the powder and sugar coating they contain rest upon the tops of the rotary disks. Both boxes are provided with angular scrapers $r^2$, which aid in filling the molds as they pass under the boxes.

*The dusting mechanism.*—When the pills are composed of sticky material, it becomes necessary to dust the chamber in the transferring-disk in order to prevent the pills from sticking to the ejector $n$. To accomplish this purpose there is secured to the knee a vertical rod $s$, on the upper end of which is fastened an arm S', extending over the transfer-disk F'. On the end of this arm is placed a dust-box S. Pivoted loosely on the rod $s$ is a sleeve $s'$, from which extends an arc-shaped cut-off plate $S^2$, provided with a small circular chamber $s^4$, adapted to pass under and to remain normally in coincidence with the outlet $s^5$ of the dust-box, the two openings being closed by an under plate $s^6$ on arm $s'$, and over which the cut-off plate plays. The cut-off plate is held in this closed position by a coil-spring $s^3$, encircling rod $s$ and having its upper or free end attached to the plate and its lower or fixed end to the rod. The cut-off plate is given a length which will permit its end $s^7$ to extend beneath and close the outlet $s^5$ of the dust-box whenever the plate is moved forward. This forward movement of the plate is effected by means of a downwardly-extending shoulder $s^8$, (shown in dotted lines,) which is timed to be engaged by the projecting flanges $f'$ of the boxes $f^2$ as the latter move from left to right, as denoted by the arrow. The continued advance of the box carries the cut-off plate along with it until the dust-chamber $s^4$ leaves the plate $s^6$, where upon it deposits its contents into the box $f^2$ below. Then the box passes away from the plate, and the recoil of the spring $s^3$ returns the plate to its former position.

*The driving and locking mechanism.*—The whole mechanism is driven through the medium of the drive-shaft H, which is provided with fast and loose pulleys P' and $P^2$ at one end and a hand-pulley $P^3$ and a pinion $n'$ at the other end. When the shaft is driven, it actuates the eccentric H, which communicates motion to the vertical shaft F through the medium of the pitman $g^3$, (see Figs. 2 and 3,) and consequently to the parallel vertical shafts D and E through the medium of the train of gears of equal size $e$, $f$, and $g$. The reciprocations of the pitman $g^3$ impart to the shaft F and its associated mechanism an intermittent rotary movement by the means which will now be described. When the pitman $g^3$ has reached the limit of its backward thrust, it has through the medium of the bell-crank lever $g'$ carried with it a disk G, fixed to the shaft F, as shown in the dotted lines in Fig. 4.

To release it from the disk and to gain a new purchase thereon for another partial rotation forward, the disk is provided with a series of holes equal in number to those in the forming, transferring, and coating disks. Coöperating with these holes are two locking-bolts $g^2$ and $i^3$, located upon the upper and lower sides of the disk and in a line with these holes. The bolt $g^2$ moves up and down in the end of one of the arms of the bell-crank lever $g'$, and in its movement it passes in and out of the holes $g^5$. Its passage upward and out of the holes releases the bell-crank lever from engagement with the disk G, and this disengagement is followed by the entrance of the bolt $i^3$ into a recess in the disk G to lock it against rotation. This movement of these two locking-bolts is effected through the medium of a vertical shaft I, provided with laterally-extending arms $i'$ and $i^2$, the former carrying on its outer end a grooved segment $i^4$ and the latter the short bolt $i^3$. The upper end of the bolt $g^2$ is provided with a head $g^4$, which enters the groove of the segment $i^4$ and plays back and forth therein when the lever $g'$ is operated. The means by which the shaft I is operated consists of a system of levers I', connected with a pitman $h'$, timed to operate in unison with the pitman $g^3$. Hence it will be seen that the shaft F is given a progressive intermittent rotary movement by locking mechanism acting like a pawl-and-ratchet device, but dissimilar in that it has the quality of locking the parts with greater precision. Coöperating with the lower locking mechanism just described is an additional upper locking device consisting of a locking-bar $n'$, secured to the side of the cross-head N. This locking-bar is adapted to enter a series of recesses $n^2$, formed in peripheral bands upon the disks D', E', and F'. These recesses equal in number the chambers and molds of the disks, there being six recesses and six chambers or molds in each disk and they are so placed as to be brought into coincidence directly beneath the locking-bar $n'$. Now when the disks are locked by the locking mechanism below, the bar $n'$ passes down into the three registering recesses, its action being caused by the rod $n^5$, walking-beam $n^3$, and pitman $n^4$. In this way a truly perfect alinement of the chambers and the molds in the disks is effected at the precise point where the plunger above will pass into them without hindrance.

Having thus described my invention, what I claim as new, and desire to secure by Letters Patent, is—

1. In a pill or tablet making machine, the combination with a rotary forming and a coating mold and their compressing-plungers, of a transferring device operating in unison with the molds and adapted to transfer the formed tablet from the forming to the coating mold.

2. In a machine for making coated pills or tablets, the combination with compressing mechanism, of molds having different capacities, and a transferring device for moving the tablet from one mold to the other, substantially as described.

3. In a pill or tablet making machine, the combination with a forming and coating mold and their compressing-plungers, of a transferring device operating in unison therewith to transfer the formed tablet from the forming to the coating mold.

4. In a pill or tablet making machine, the combination with suitably-timed plungers, of rotary forming and coating molds, a transferring-disk, and feed-boxes communicating with the molds.

5. In a pill or tablet machine, the combination with forming and coating molds and their compressing-plungers, of a transferring device operating in unison therewith to transfer the formed tablet from the forming to the coating mold, and a locking device to momentarily arrest the movements of the parts when the mold and the transferring device coincide.

In witness whereof I affix my signature in presence of two witnesses.

PARKER J. NOYES.

Witnesses:
H. D. F. HILLIARD,
EDMUND SULLIVAN.